(12) United States Patent
Couse et al.

(10) Patent No.: US 11,330,797 B2
(45) Date of Patent: May 17, 2022

(54) EXTERNAL AND INTERNAL MONITORING OF ANIMAL PHYSIOLOGY AND BEHAVIOR

(71) Applicant: i4C Innovations Inc., Middleburg, VA (US)

(72) Inventors: John Michael Couse, Toronto (CA); Joe Paul Tupin, Jr., Round Hill, VA (US); Michael Stanfield, The Plains, VA (US); Jeffrey Noce, Alexandria, VA (US)

(73) Assignee: i4C Innovations Inc., Cazenovia, NY (US)

(*) Notice: Subject to any disclaimer, the term of this patent is extended or adjusted under 35 U.S.C. 154(b) by 320 days.

(21) Appl. No.: 16/326,319

(22) PCT Filed: Aug. 23, 2017

(86) PCT No.: PCT/US2017/048200
§ 371 (c)(1),
(2) Date: Feb. 18, 2019

(87) PCT Pub. No.: WO2018/039336
PCT Pub. Date: Mar. 1, 2018

(65) Prior Publication Data
US 2019/0183092 A1 Jun. 20, 2019

Related U.S. Application Data

(60) Provisional application No. 62/378,462, filed on Aug. 23, 2016.

(51) Int. Cl.
*A62B 35/00* (2006.01)
*A01K 11/00* (2006.01)
*A01K 27/00* (2006.01)
(Continued)

(52) U.S. Cl.
CPC .......... *A01K 11/006* (2013.01); *A01K 27/001* (2013.01); *A01K 27/002* (2013.01);
(Continued)

(58) Field of Classification Search
CPC ... A01K 11/006; A01K 27/001; A01K 27/002
(Continued)

(56) References Cited

U.S. PATENT DOCUMENTS 10,420,325 B2 * 9/2019 Czarnecky ............ G01S 19/14
2002/0010390 A1   1/2002 Guice et al.
(Continued)

FOREIGN PATENT DOCUMENTS

DE    102014108443 A1   12/2015
WO         0237952 A1    5/2002
(Continued)

OTHER PUBLICATIONS

Dec. 13, 2019—(AU) Examination Report—App 2017315360.
Jun. 2, 2020—EP Office Action—EP 17761705.7.
Nov. 20, 2017—International Search Report and Written Opinion—Appl. No. PCT/US2017/048200.

*Primary Examiner* — Ahshik Kim
(74) *Attorney, Agent, or Firm* — Banner & Witcoff, Ltd.

(57) ABSTRACT

A method and system for the continuous monitoring of animal physiology and behavior through the use of a smart body worn animal harness, smart collar or restraint system which captures, pre-processes, monitors, and transmits data captured from a plurality of externally-based, skin contact-based, and internally located RFID implants to a cloud-based infrastructure for further processing and augmentation to support real time alerting and animal health analytical systems.

15 Claims, 6 Drawing Sheets

(51) Int. Cl.
*A01K 29/00* (2006.01)
*G06K 7/10* (2006.01)
*G06K 19/07* (2006.01)
*G06K 19/077* (2006.01)
*H01Q 1/22* (2006.01)
*H01Q 1/27* (2006.01)
*H01Q 21/00* (2006.01)

(52) U.S. Cl.
CPC .......... *A01K 27/009* (2013.01); *A01K 29/005* (2013.01); *G06K 7/10366* (2013.01); *G06K 19/0702* (2013.01); *G06K 19/07773* (2013.01); *H01Q 1/225* (2013.01); *H01Q 1/2225* (2013.01); *H01Q 1/273* (2013.01); *H01Q 21/0025* (2013.01)

(58) Field of Classification Search
USPC .................................................. 119/859, 858
See application file for complete search history.

(56) References Cited

U.S. PATENT DOCUMENTS

| | | |
|---|---|---|
| 2014/0121558 A1 | 5/2014 | Alonsoperez Lanza |
| 2014/0182519 A1 | 7/2014 | Tupin, Jr. |
| 2014/0336524 A1 | 11/2014 | Stewart |
| 2016/0120154 A1 | 5/2016 | Hill et al. |
| 2016/0174099 A1* | 6/2016 | Goldfain ............... A61B 5/1116 375/130 |
| 2016/0242393 A1* | 8/2016 | Kennedy .............. A01K 29/005 |
| 2017/0095206 A1 | 4/2017 | Leib et al. |
| 2017/0181407 A1* | 6/2017 | Bonge, Jr. ............... G06F 8/656 |

FOREIGN PATENT DOCUMENTS

| | | |
|---|---|---|
| WO | 2015127228 A1 | 8/2015 |
| WO | 2015145422 A1 | 10/2015 |

\* cited by examiner

EXTERNAL AND INTERNAL MONITORING OF ANIMAL PHYSIOLOGY AND BEHAVIOR

CROSS-REFERENCE TO RELATED APPLICATIONS

This application claims priority to, is a U.S. National Stage application under 35 U.S.C. § 371 of International Application number PCT/US2017/048200 (published as WO 2018/039336 A1), filed Aug. 23, 2017, which claims benefit of U.S. Provisional patent application Ser. No. 62/378,462, filed on Aug. 23, 2016, the contents of which are incorporated by reference to their entirety.

TECHNICAL FIELD

One or more aspects disclosed herein relate to the physiological and behavioral monitoring of animals in various settings including pre-operation, surgical, post-operation, acute care, chronic care, trauma care, clinical, home recovery, and laboratory settings.

BACKGROUND

Animal monitoring in various settings, whether those settings are pre-operation, surgical, post-operation, acute care, chronic care, trauma, clinical, home recovery or a laboratory environments, all can benefit from the use of monitoring techniques that do not require physical intervention to obtain valid physiological and behavioral data. The use of hands-free automated monitoring systems for the capture of vital sign readings and behavioral activities is preferable to the animals being physically handled to take such readings. As such, the proper deployment of this type of monitoring techniques should result in the animal not being disturbed, harmed in anyway, or having its anxiety levels increased. Automated monitoring techniques have the potential to provide more accurate, physiological readings as identified in clinical research papers citing phenomena such as the "white coat syndrome".

Non-invasive monitoring techniques can also be augmented with invasive RFID implants that provide information relating to internal physiology readings including, for instance, core temperature, glucose, and other physiology readings. In previous implementations of implanted RFIDs to obtain physiology readings, the implanted devices required human intervention (typically using a wand-type RFID reader being placed within 3 cm of the actual RFID implant). While the physiological information obtained using implanted RFID devices is useful, the information obtained is not without bias. Research papers show that animals consistently react negatively or positively to the close proximity of humans (even as far as varying based on the sex of the veterinary technician). As such, the monitoring of animals may be influenced by the very act of attempting to obtain the readings. The increase an animal's anxiety levels or the hiding of pain levels will lead to the capturing of false readings.

In a laboratory setting there is continued regulatory pressure to provide an environment that assists in meeting what has become known as the three "R's", namely principles of Replacement, Refinement, and Reduction (as published by W. M. S. Russell and R. L. Burch). If done properly, the capturing of continuous and more reliable clinical information will allow for the development of more accurate animal computer models and therefore lead to a replacement of laboratory animals where computer models will now suffice. Refinement can be achieved if the automated monitoring environment enhances an animal's well-being and minimizes or eliminates unnecessary pain or distress. Reduction can be achieved if the amount of information gathered can be maximized from a given number of animals so that in the long run, fewer animals are needed to acquire the same scientific information.

Using a manual RFID wand technique is expensive due to the high labor component plus they also can be tricked into providing false readings. For example, a temperature-based microchip implant located subcutaneously between the shoulder blades of the animal can be negatively affected by external heat sources such as sun light, warming pads, heat lamps, baseboard heaters, heat vents etc. These readings, without collaboration with other external ambient temperature sensors can lead to inaccurate research data.

In laboratories today, "Thunder Jackets" provide a way to attach several sensors to an animal including the placement of antennas to read RFID microchips. The issue with animals wearing these types of jackets is that it restricts their movements and causes to them to artificially heat up. Although Thunder Jackets (sometimes referred to as "ThunderShirts") are used with skittish animals in a home setting for short periods of time they are not a traditional daily device that a companion animal would wear a continuous basis.

SUMMARY

What is proposed is a smart adjustable collar, restraint collar or harness suitable for any animal species. In one or more embodiments, it includes a central electronics enclosure containing a microcontroller, memory, battery, various communications radios and flexible connection points to support various other on-board and off-board sensors and antennas. Such antennas may be in the form of an emitting antenna array capable of exciting nearby passive RFID microchips. Such a type of antenna may also be situated inside the main electronics enclosure. In an alternative approach, the antenna may be placed (along with other various sensors and antennas) within close proximity to what is being measured. For example, one technique to read passive RFID implanted chips, which can be located between the shoulder blades of the animal, that can transmit animal ID and various other information such as temperature and glucose levels etc., is to move the antenna directly over the implant or least in close proximity to it. In the case of a smart collar, this may be located at the traditional apex of the collar on the animal. To support the required location flexibility, electronic enclosures, sensors, and antennas may be swapped out and positioned anywhere on the harness or collar by using quick release types of systems such as Velcro or snaps or other related quick release systems. One benefit of having an adjustable system is that the actual location of the harness and how it is positioned on the animal is adjustable to permit the harness to stay away from or alternatively be proximate to a location of interest on the animal (including but not limited to the site of an incision or injury).

The proposed UWB or other suitable sensing technology may be used to capture the animal's heart rate with the antennas (for example, a pair of transmit and receive antennas) placed directly over the very small diameter carotid arteries located in the neck to obtain signals. In comparison, if the same sensor and/or antennas are moved in front of the heart, the sensor now has a lager target to investigate as well there is now an opportunity to also measure blood pressure.

Another example of moving sensors and antennas around the animal's body location may include the placement of an UWB antenna or additional UWB antennas directly over the lungs of the animal to detect fluid in or around the lungs and the heart as well as measuring respiration rates. This type of detection capability may be useful in monitoring the onset of chronic bronchitis and/or chronic emphysema among other lung diseases that block airflow and making it difficult to breathe (in the case of dogs and wolves, canine COPD—chronic obstructive pulmonary disease) and congestive heart failure (CHF). Another reason for moving sensors away from the central electronics enclosure is that it may remove various potential noise artifacts in the form of battery and circuitry heat gain and other electrical and RF interference signals.

In another embodiment, the above described sensing systems may be incorporated into a common hard restraint collar used with non-human primate studies. With such collars, the animal's physiological readings may be captured through the entire process of being taken from the home cage, during transportation, and throughout the research protocol.

The system described herein is designed to be more intelligent than designs in the past in that, even if the connection to the local or cloud-based server is not available, the system may continue to run on its own. This may include on-board algorithms that receive input from the sensors and possible external inputs (descriptions of environments or procedures) and make decisions on which configuration to run. For example, it may determine when it is an appropriate time to take an implant temperature reading based on local occurring events such as ambient temperature, core temperature, accelerometer activity (or lack of), heart rate, heart rate variation, blood pressure or respiration readings plus the number of hours after an operation, etc. When the server is available, the system may take additional inputs including the receiving of new configuration settings, the facility's own ambient temperature readings, computed and derived data, and direct instructions from the knowledge workers and veterinary technicians connected to the system. The body-worn system may be able execute the provided configurations as provided or use a confidence factor to determine if the provided configuration is the most appropriate one to execute, use an existing configuration stored in memory or derive a new configuration to fit the conditions at hand. These types of described actions are beneficial to extending battery life, managing on-board memory resources and providing less error-prone data.

In various embodiments, the system includes the body-mounted sensors and an external data storage. For instance, a central analytical server part of the system (for example, a server including rack-mounted processors and memory or other types of server implementations) may include the ability to augment the data collected by the body worn system by taking raw and processed data from other external systems as well. Such systems may include video capture systems that interpret body movement and classify the behavior into categories such as agitated, panting, and scratching etc.

The advantage of a smart harness over a Thunder Jacket is that a smart harness is less restrictive to the animal's movements as well as does not contribute to the animal overheating, which may lead to the capturing of false body temperatures and/or putting the animal in distress.

In one example, the components may be integrated with each other in a single enclosure or, in another example, may be in separate enclosures. In yet another example, the electronic enclosure allows for several external antennas and sensors to be attached to it in a plug and play fashion. Through self-discovery (e.g., a plug-and-play interoperability architecture), the on-body electronics package may be able to determine what antenna or sensors have been plugged into it. "Plugged in" refers to connecting by any means to the electronic enclosure using techniques such as magnetic connectors, plugs or through RF means using technologies such a low energy Bluetooth (e.g., BLE), Zigbee or other low energy, body sensor network RF techniques etc.

External components that require hard wired connections to the electronics enclosure may be routed through a provided wiring slot or a protected cable sheath on the inside of the harness or restraint collar. Such a method will keep all of the wires neat, protected and inaccessible by the animal being monitored (or, in the case of multiple animals in a cage, keeping the wires safe from inquisitive cage mates).

DETAILED DESCRIPTION

Figure 1:
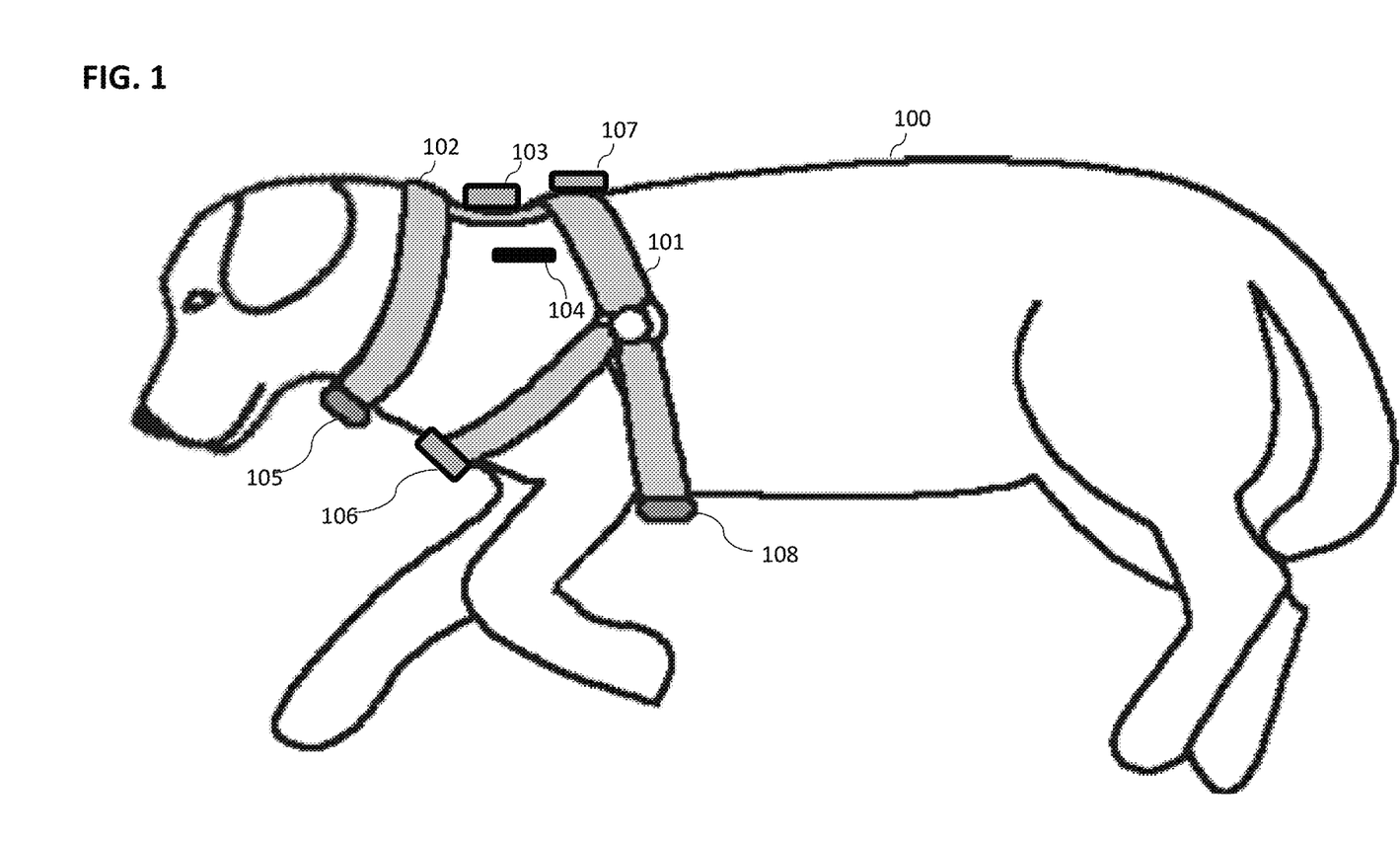
FIG. 1 shows an animal with a harness in accordance with one or more embodiments of the disclosure.

FIG. 1 shows an animal, in this case a canine 100, in a post-op recovery environment with a smart harness 101 and an optional soft smart collar 102 attached to the harness. The body worn electronics enclosure 103 is located in a position on the harness as to not interfere with the animal's ability to turn over comfortability or interfere with a surgical site. In this particular embodiment, there is a microchip 104 inserted subcutaneously between the shoulder blades of the animal. Other sensors or antennas are located at various places to optimize their reading capabilities. In this illustration, there is an ambient temperature, light sensor and microphone located at the neck position 105 facing outward, a set of UWB antennas 106 to centrally investigate the state of the respiratory system and a set of UWB antennas 108 to investigate the heart. Alternatively, there may actually be two sets of UWB paired antennas with one set located on either side of the animal's chest to provide a left side/right side determination of potential respiratory issues. In the case of passive RFID implanted chips 104 there are special antennas 107 located in close proximity to the chip to excite the unit to transmit its information to the body worn electronics enclosure. All items described above may be attached and readjusted with the use of Velcro or like types of attachment mechanisms.

Figure 2A:
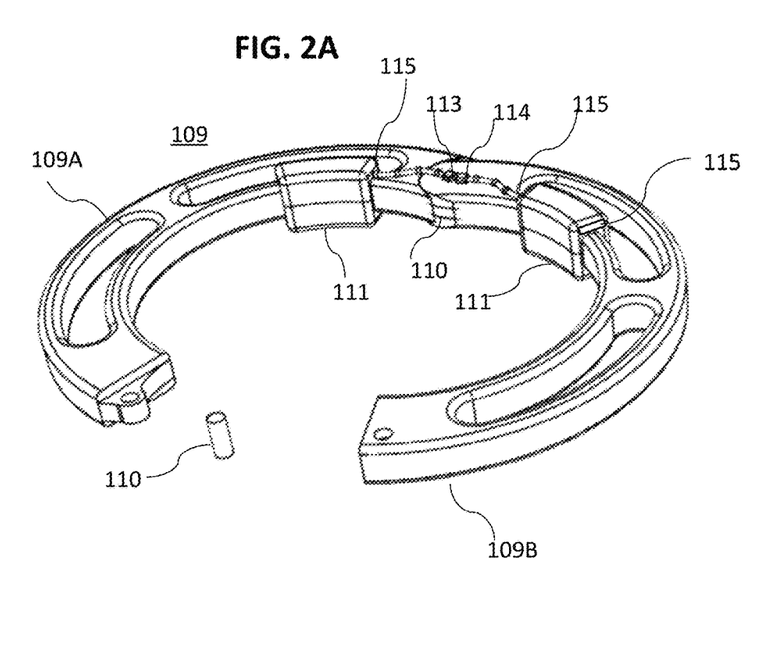
FIG. 2 shows open and closed versions of a collar in accordance with one or more embodiments of the disclosure.
Figure 2B:
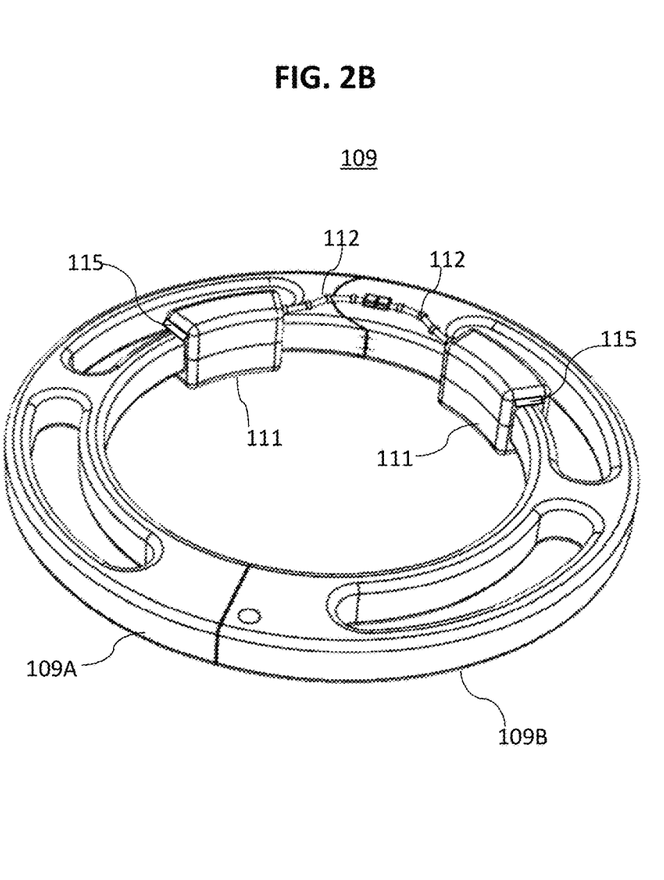

FIGS. 2A and 2B shows round versions of hard restraint collar 109. Passive hard restraint collars are typically used in non-human primate research. The collars described herein may include two or more metal or plastic partial ring segments 109A and 109B held together with one or more pins 110. Also, they may include one or more sensors and one or more processors. In this illustration, two sensor packages 111 have been snapped onto each side of the rings connected by an armored cable 112. The cable may either be continuous or be in the form of a male 113 and a female plug 114 on either side that disconnects when the collar in opened and reconnects when the collar is closed. Such a connector may be made with pins and corresponding sockets or it may be a magnetic type of connector or other known construction. The sensor packages may have multiple input/output ports 115 that may be daisy chained together so that additional modules, that may contain the same or different senor configurations, may be positioned around the collar where required. Contained in the sensor packages are microcontrollers, memory, accelerometers, and various sensors including UWB antennas that may read the micro movements of the carotid arteries and neck muscles to record various physiological signs of the restrained animal. The sensor packages may include one or more wireless transmission technologies that may be used to communicate with the smart harness described above or other to access points that may be available. In another embodiment, the restraint collar is designed to have the sensor packages installed at the time of manufacture and all of the cabling would be integrated out-of-sight into the collar housing or each collar module would communicate with other on a wireless basis. Modules may operate on an independent basis, on a slave/master basis or they may they collaborate to meet specific configuration settings objectives.

Figure 3:
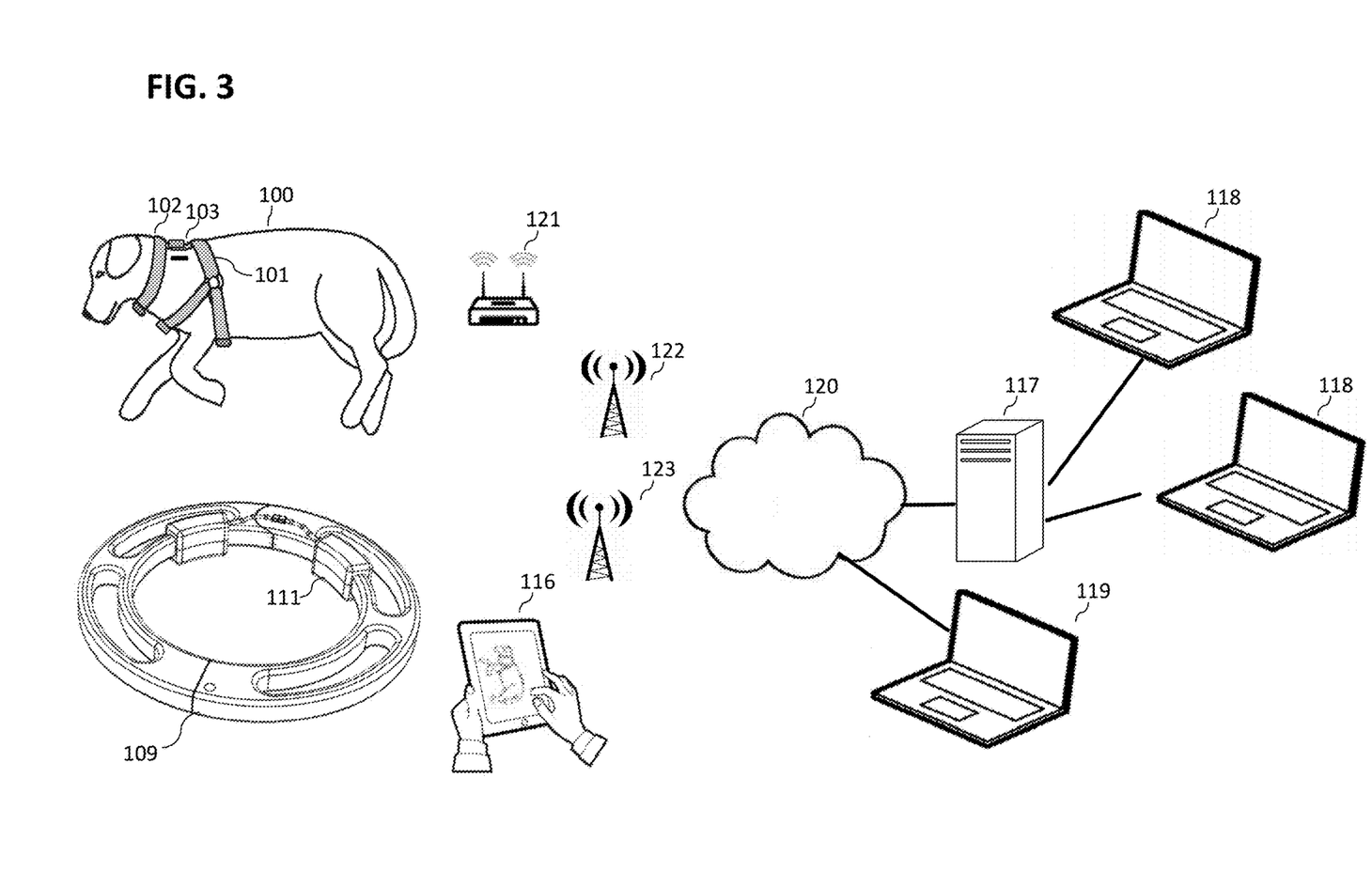
FIG. 3 shows an illustrative environment showing a collar or harness in combination with other systems in accordance with one or more aspects of the disclosure.

FIG. 3 shows an illustrative layout in a laboratory or clinical environment where the animal 100 wearing a smart harness 101, smart soft collar 102 or a smart hard restraint collar 109 is being monitored by a veterinary technician 116 on their rounds with a portable mobile device such as a tablet. The veterinary technician 116 at this time may review historical and real time readings on their portable display unit and also review recommendations for settings or configurations for the specific animal-based sensor system using electronics enclosure 103, 111 that they are observing. Such settings and configurations may be derived by algorithms on the central analytical server 117, by local 118 or off-site 119 knowledge workers or by the sensor module itself. For instance, based on initial data collected from the sensors or an identification of which sensors are connected to the harness or collar/via wires or wirelessly, the system may configure itself to obtain and/or provide its readings at given intervals or when one sensor or sensors has bene triggered (e.g., lack of significant movement for 20 minutes as determined by analyzing signals from an accelerometer). Alternatively or additionally, the technician may compare all of these provided recommended configurations and based on their own physical observations, make a selection or configure their own settings. The technician's mobile device 116 may also act as a communications gateway by using its Bluetooth connection to establish a connection between the electronics enclosures 103, 111 and the central analytical server 117 through the mobile device's on-board Wi-Fi or cellular capabilities. The electronic enclosures 103, 111 attached to the animal have the ability to monitor and store collected data on an independent basis even if it loses connectivity with the central-based analytical server system 117. Independently it may follow pre-stored configurations rules or derive new configurations based on locally encountered conditions. As well as the technician's mobile device, there are various ways to transfer the gathered data to the cloud or local-based central analytical server 117 which may be attached to the Internet 120 using techniques such as light, sound, WiFi 121, cellular 122 and LoRA 123-based technologies that have Internet connections themselves. Various types of knowledge workers 118 may access the server 117 located in the cloud to gain access to raw data, summarized data and derived data. Such data may also be augmented with other external collected data about the specific animal that is gathered by independent means. This may include the use of automated or manual video classification systems or veterinary technician observations of behavior or pain levels using tools such as the grimace pain scale.

Figure 4:
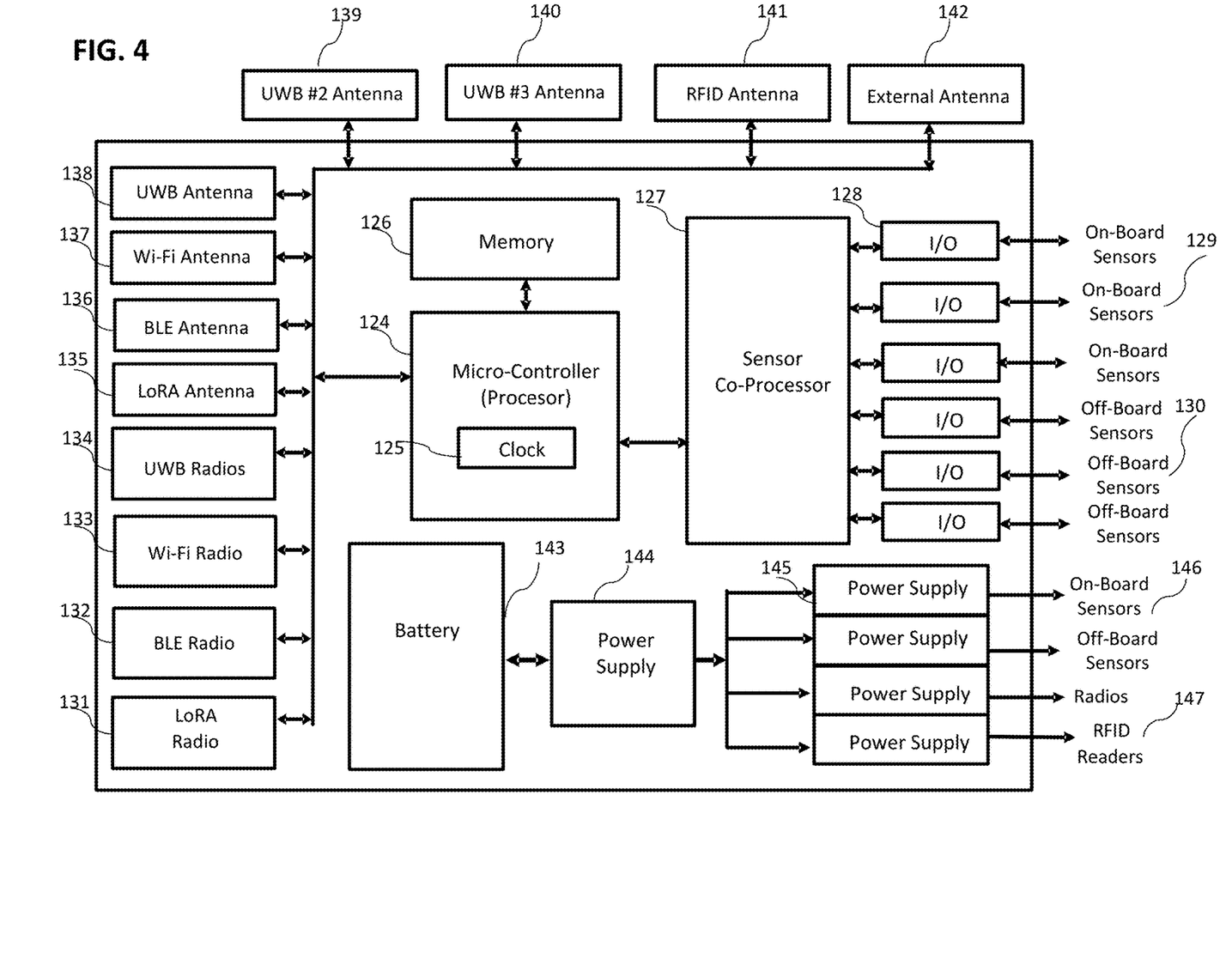
FIG. 4 shows an illustrative example of components in a harness or collar in accordance with one or more aspects of the disclosure.

FIG. 4 shows the layout of the electronics enclosure 103, 111 that may be split across several actual physical modules which contains a microcontroller 124, an internal synchronized clock 125, memory 126, sensor co-processors 127, and various digital and analogue input/output (I/O) controllers 128. These controllers are then attached to various sensors that are located both inside the enclosure 129 and outside the enclosure 130. Connected to the microcontroller 125 are various RF radios and associated antennas such as LoRa (sub-gigahertz radio) 131,135, Bluetooth 132, 136, WiFi 133, 137, various on-board and off board UWB radios 134 and antennas 138, 139, 140, plus various RFID 141, 142 antennas etc. To power all of the on-board and off-board electronics, sensors and antennas, the system may include on-board battery 143 that is then connected to a master power supply unit 144 that in turn provides specific power 145 to specific on-board components 146 and off-board components 147.

Figure 5:
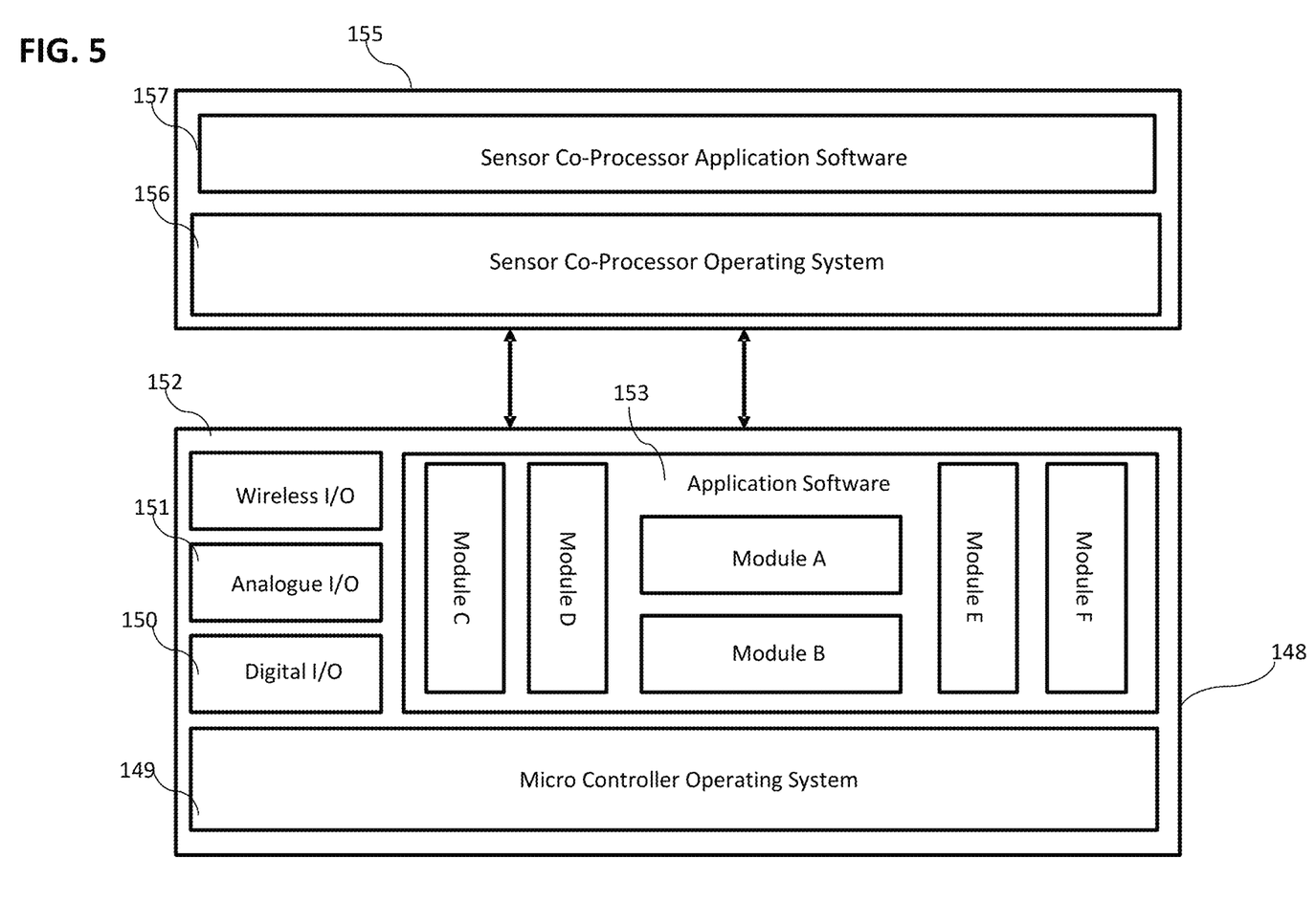
FIG. 5 shows an illustrative example of interaction of at least two components on an animal in accordance with one or more aspects of the disclosure.

FIG. 5 shows the layers of software and firmware 148 that may be used to operate the electronic enclosure 103, 111. Included in this software stack is a micro-controller operating system 149, digital I/O 150, analogue I/O 151, and wireless I/O 152 firmware and software. Application software 153 includes various modules to run various configurations that may beneficially impact on battery availability by reducing the rate of the taking of sensor readings as well as algorithms to test the quality of the data being captured as well consolidate or compress certain readings that are not important for the overall objectives of the monitoring model. The application software may also include a module 154 to ensure that all of the radios operate in a fashion that meet their FCC or other national regulatory body RF transmission protocols. To reduce processing requirements of the main micro-controller, the system may include one or more sensor co-processors 155 that connects directly to various sensors. The co-processors 155 may include both an operating system 156 and specific application software 157.

Figure 6:
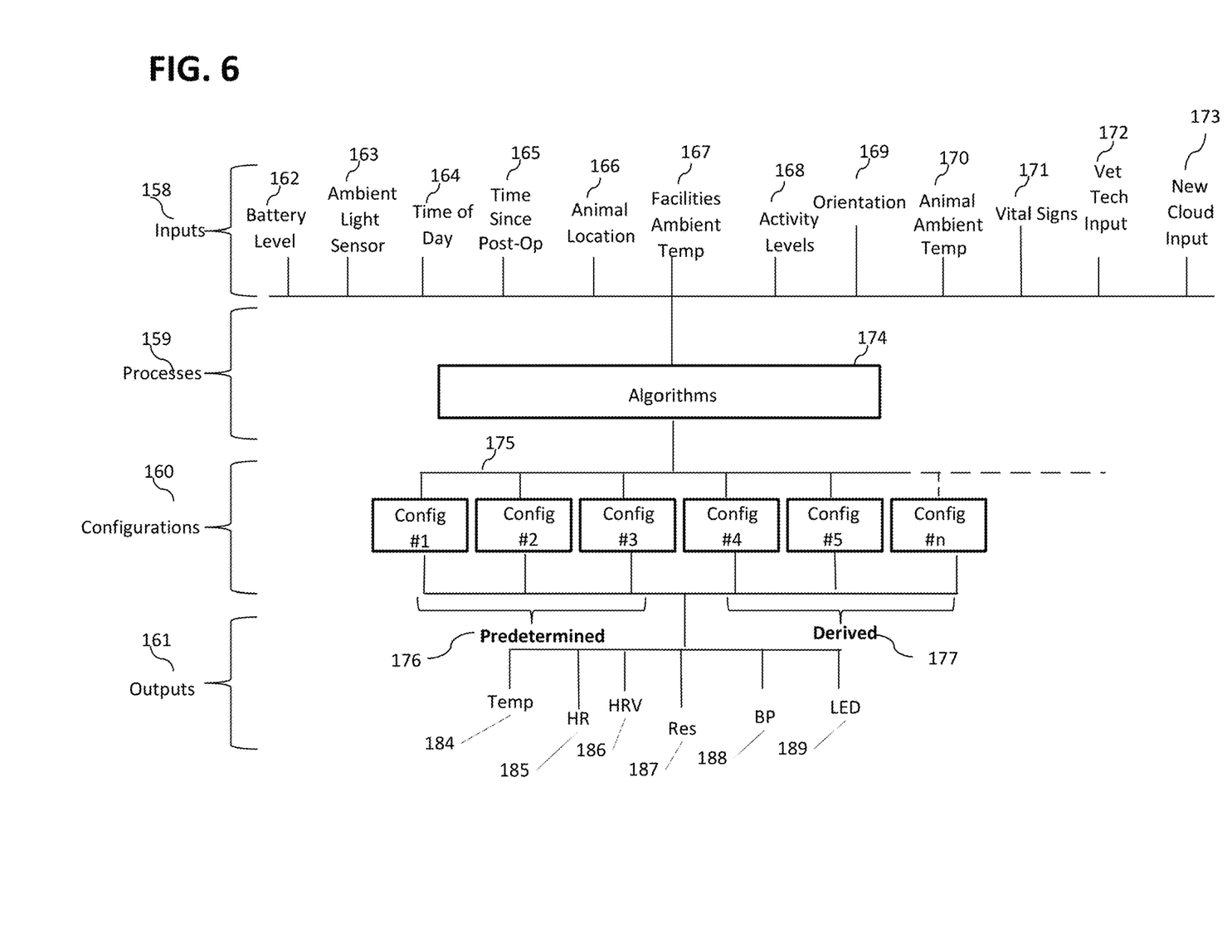
FIG. 6 shows an illustrative example of various inputs, processes, configuration settings, and outputs associated with a sensor monitoring system in accordance with one or more aspects of the disclosure.

FIG. 6 is an illustrative example of inputs 158, processes 159, configurations 160, and outputs 161 for a single enclosure or multiple enclosures for monitoring an animal In this case, a plurality inputs are provided to the processing level such as battery level 162, ambient light 163, time of day 164, time since post-op 165, actual location of the animal clinic/laboratory/home 166, ambient facilities temperature or home setting 167, activity levels 168, animal position or orientation as measured internally and by externals means 169, ambient temp (as measured at the animal level) 170, vital signs (heart rate (HR), heart rate variation (HRV), blood pressure, respiration) 171, vet tech observations and inputs 172, and new information and configurations from the cloud-based or local-based analytical server 173. The algorithms 174 takes all of the data available and runs a confidence level to determine which configuration 175 it should run. In some cases, especially when the system is running in a non-connected manner, it may likely make that decision on its own and pick a pre-determined configuration 176 or even come up with a brand new derived configuration 177. Such configurations may change sampling frequencies, calibrations, off-sets, sequencing, triggering etc. of such activities such as capturing and determining core temperature 184, heart rate 185, HRV 186, respiration rate 187, blood pressure 188, and electronic enclosure LED display patterns 189.

An illustrative algorithm may include one or more of the following steps:
A. Monitor wired and wireless inputs for additional sensors being added to the sensors known to microcontroller 124 or being removed from sensors connected to microcontroller 124;
B. Add additional sensors to list of active sensors or remove the missing sensor from the list of active sensors;
C. Determine if one of the sensors has either exceeded or dropped below a threshold for a given period of time;
D. Upon determination, obtain readings from additional sensor or sensors;
E. Store sensor readings with timestamps; and/or
F. Upload sensor readings to external storage.

A number of embodiments have been described where it is understood that various modifications may be made without departing from the spirit and scope of the invention.

We claim:
1. A system comprising:
a harness with a plurality of attachment positions comprising at least a first attachment position and a second attachment position;
a first sensor configured to obtain at least one first physiology reading and wireless transmit a signal related to the at least one physiology reading;
an electronics enclosure removably attached to the harness at one of the first attachment position or the second attachment position, wherein the electronics enclosure comprises:
a first antenna configured to receive reflected ultrawideband signals;
a second antenna configured to receive the signal related to the at least one first physiology reading obtained by the first sensor;
a third antenna;
a processor configured to interpret the reflected ultrawideband signals as a second physiology reading; and
a memory storing at least a first configuration associated with the first attachment position, a second configuration associated with the second attachment position, and a selection of one of the first configuration or the second configuration,
wherein, in each of the first configuration and the second configuration, the processor is configured to obtain the second physiology reading,
wherein the processor is configured to send, via the third antenna, the at least one first physiology reading and the second physiology reading,
wherein, based on the selection of one of the first configuration or the second configuration, the processor identifies the second physiology reading associated with one of the first attachment position or the second attachment position,
wherein the first sensor is located outside the electronics enclosure, and wherein the first sensor is configured to operate based on commands from the processor.
2. The system according to claim 1, further comprising:
a battery located within the electronics enclosure,
wherein the battery is electrically connected to the processor and provides power to the processor.
3. The system according to claim 2, further comprising:
an ultra-wideband transmit antenna spaced from the first sensor; and
an ultra-wideband receive antenna spaced from the first sensor,
wherein the processor outputs an ultra-wideband signal to the ultra-wideband transmit antenna and receives a reflected ultra-wideband signal from the ultra-wideband receive antenna.
4. The system according to claim 1, further comprising:
a second sensor spaced from the first sensor,
wherein the processor is configured to receive, via the second antenna, a third physiology reading obtained by the second sensor.
5. The system according to claim 4,
wherein the second antenna is configured to receive Bluetooth signals.
6. The system of claim 1,
wherein, based on the selection of first configuration, the processor identifies the second physiology reading as a heart rate reading.
7. The system of claim 1,
wherein, based on the selection of second configuration, the processor identifies the second physiology reading as a respiratory rate reading.
8. A system comprising:
a collar having a plurality of attachment positions comprising at least a first attachment position and a second attachment position;
a first sensor configured to obtain at least one first physiology reading and wireless transmit a signal related to the at least one physiology reading;
an electronics enclosure fixedly attached to the collar at one of the first attachment position or the second attachment position, wherein the electronics enclosure comprises:
a first antenna configured to receive reflected ultrawideband signals;
a second antenna configured to receive the signal related to the at least one first physiology reading obtained by the first sensor;
a third antenna;
a processor configured to interpret the reflected ultrawideband signals as a second physiology reading; and
a memory storing at least a first configuration associated with the first attachment position, a second configuration associated with the second attachment position, and a selection of one of the first configuration or the second configuration,
wherein, in each of the first configuration and the second configuration, the processor is configured to obtain the second physiology reading,
wherein the processor is configured to send, via the third antenna, the at least one first physiology reading and the second physiology reading,
wherein, based on the selection of one of the first configuration or the second configuration, the processor identifies the second physiology reading associated with one of the first attachment position or the second attachment position, and wherein the first sensor is configured to operate based on commands from the processor.

9. The system according to claim 8, further comprising:
a battery within the electronics enclosure,
wherein the battery is connected to the processor and provides power to the processor.

10. The system according to claim 9,
wherein the first sensor is spaced from the electronics enclosure.

11. The system according to claim 9, further comprising:
an ultra-wideband transmit antenna spaced from the sensor; and
an ultra-wideband receive antenna spaced from the sensor,
wherein the processor outputs an ultra-wideband signal to the ultra-wideband transmit antenna and receives a reflected ultra-wideband signal from the ultra-wideband receive antenna.

12. The system according to claim 8, further comprising:
a second sensor spaced from the first sensor,
wherein the processor is configured to receive, via the second antenna, a third physiology reading obtained by the second sensor.

13. The system according to claim 12,
wherein the second antenna is configured to receive Bluetooth signals.

14. A system comprising:
a support structure having a plurality of attachment positions;
at least two sensors attached to the support structure, with the at least two sensors selected from a group of three sensors, wherein each sensor is removably attached to the support structure at one of the plurality of attachment positions;
a memory storing two or more configurations; and
a processor attached to the support structure,
wherein the processor determines which sensors are present and obtains readings from the sensors, and
wherein the processor is configured to transmit readings differently based on a selected one of the configurations.

15. The system according to claim 14, further comprising:
an ultra-wideband transmit antenna spaced from the at least two sensors; and
an ultra-wideband receive antenna spaced from the at least two sensors,
wherein the processor outputs an ultra-wideband signal to the ultra-wideband transmit antenna and receives a reflected ultra-wideband signal.

* * * * *